(12) United States Patent
Tsai et al.

(10) Patent No.: US 9,108,643 B2
(45) Date of Patent: Aug. 18, 2015

(54) DRIVING ASSISTANT METHOD AND SYSTEM FOR ELECTRIC VEHICLE

(75) Inventors: I-Ta Tsai, Chiayi (TW); Yu-Hui Lin, Miaoli County (TW); Cheng-Yu Wu, Hualien County (TW); Yi-Chun Lin, Tainan (TW); Channing Chang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 1139 days.

(21) Appl. No.: 13/082,421

(22) Filed: Apr. 8, 2011

(65) Prior Publication Data

US 2012/0194346 A1 Aug. 2, 2012

(30) Foreign Application Priority Data

Jan. 28, 2011 (TW) .............................. 100103461 A

(51) Int. Cl.
| | | |
|---|---|---|
| *G08B 21/00* | (2006.01) | |
| *B60W 50/14* | (2012.01) | |
| *G01C 21/34* | (2006.01) | |
| *B60W 40/12* | (2012.01) | |
| *B60W 50/00* | (2006.01) | |

(52) U.S. Cl.
CPC ........... *B60W 50/14* (2013.01); *G01C 21/3469* (2013.01); *B60W 40/12* (2013.01); *B60W 50/0097* (2013.01); *B60W 2510/244* (2013.01); *B60W 2510/248* (2013.01); *B60W 2520/10* (2013.01); *B60W 2530/10* (2013.01); *B60W 2550/143* (2013.01); *B60W 2550/402* (2013.01)

(58) Field of Classification Search
CPC ............ Y02T 10/7088; Y02T 10/7077; Y02T 10/7291; Y02T 90/14; Y02T 90/128; Y02T 90/163; B60L 2240/62; B60L 2260/52; B60L 2260/54; G08B 1/137; G08B 1/20
See application file for complete search history.

(56) References Cited

U.S. PATENT DOCUMENTS

| | | | |
|---|---|---|---|
| 5,539,399 A * | 7/1996 | Takahira et al. | ......... 340/995.27 |
| 5,815,824 A | 9/1998 | Saga et al. | |
| 6,864,807 B2 | 3/2005 | Todoriki et al. | |
| 7,302,320 B2 | 11/2007 | Nasr et al. | |
| 2003/0006914 A1* | 1/2003 | Todoriki et al. | ................ 340/995 |
| 2004/0044452 A1 | 3/2004 | Bauer et al. | |
| 2006/0155717 A1* | 7/2006 | Davis et al. | ................... 707/100 |

(Continued)

FOREIGN PATENT DOCUMENTS

| | | |
|---|---|---|
| CN | 1920894 | 2/2007 |
| EP | 1056181 | 11/2000 |

(Continued)

OTHER PUBLICATIONS

"Office Action of China Counterpart Application", issued on Jul. 2, 2013, p. 1-p. 6.

(Continued)

*Primary Examiner* — Kerri McNally
*Assistant Examiner* — Renee Dorsey
(74) *Attorney, Agent, or Firm* — Jianq Chyun IP Office

(57) ABSTRACT

A driving assistant method for an electric vehicle is provided with the following steps. When the electric vehicle is started up, a battery energy safe driving region is calculated and displayed. The battery energy safe driving region is updated dynamically according to vehicle information. The vehicle information includes battery information of the electric vehicle.

32 Claims, 16 Drawing Sheets

(56) References Cited

U.S. PATENT DOCUMENTS

| | | | |
|---|---|---|---|
| 2007/0029121 A1* | 2/2007 | Saitou et al. | 180/65.2 |
| 2008/0154671 A1* | 6/2008 | Delk | 705/7 |
| 2009/0082957 A1 | 3/2009 | Agassi et al. | |
| 2010/0106401 A1* | 4/2010 | Naito et al. | 701/201 |
| 2011/0241905 A1* | 10/2011 | Niwa | 340/995.1 |
| 2012/0179395 A1* | 7/2012 | Gilman et al. | 702/61 |

FOREIGN PATENT DOCUMENTS

| | | |
|---|---|---|
| JP | 2006113892 | 4/2006 |
| TW | 201017198 | 5/2010 |

OTHER PUBLICATIONS

"Office Action of Taiwan Counterpart Application", issued on Jul. 23, 2013, p. 1-p. 4.

* cited by examiner

DRIVING ASSISTANT METHOD AND SYSTEM FOR ELECTRIC VEHICLE

CROSS-REFERENCE TO RELATED APPLICATION

This application claims the priority benefit of Taiwan application serial no. 100103461, filed Jan. 28, 2011. The entirety of the above-mentioned patent application is hereby incorporated by reference herein and made a part of this specification.

BACKGROUND

1. Field of the Disclosure

The disclosure relates to a driving assistant method and system for an electric vehicle capable of dynamically displaying a guiding region.

2. Description of Related Art

Under global concern of green energy issues and environmental protection issues, low emission or zero emission electric vehicle industry becomes a focus of development in transportation equipments. Regardless of what kind of future electric vehicle may become a mainstream, from electric buses to electric cars all have a demand for electricity charging. Although it is most likely to build a large number of electricity supplying equipments (for example, charging equipment installed in home, charging stations or battery exchange stations constructed at parking areas of companies or shopping malls, etc.) in the future to meet the needs of a large amount of the charging demands, worry about battery life still influences popularity of the electric vehicle.

A plurality of applicable methods has been provided for charge navigation, though in these methods, real-time information (for example, traffic status, path and destination planning, etc.), driver's demand, electricity supplying equipments and geographic information are not considered, and the driver of the electric vehicle has to make a concession to a planning result of electricity supplying equipment navigation in order to facilitate battery charging, battery exchange to improve the battery life, which causes inconvenience to the driver, and also affects willingness of the driver of using the electric vehicle.

In the conventional technique, a method for selecting neighbouring charging stations is provided, by which when remained battery energy is less than a predetermined value, a maximum driving region is calculated, and path options for driving to the neighbouring charging stations are listed. However, when it is discovered that the remained battery energy is less than the predetermined value, it is possible that none charging station is located within the maximum driving region. Therefore, although the maximum driving region is calculated, it is of no use, and the driver has to call for roadside assistance.

Further, another conventional technique provides a hybrid electric vehicle with a navigation function, by which after a destination is determined, it is determined whether the remained battery energy is enough to reach the destination. When it is determined that the destination cannot be reached, a driving distance corresponding to the remained battery energy is calculated, and the electricity supplying equipments are displayed according to the driving distance to implement the charge navigation. Therefore, the hybrid electric vehicle is integrated with a general navigation function, and after the destination is input, the driving distance is calculated, and if the destination is frequently varied, the destination has to be input for each variation.

SUMMARY OF THE DISCLOSURE

The disclosure is directed to a driving assistant method and system for an electric vehicle, which is capable of displaying a regional guidance to provide a user more flexible driving path selections.

The disclosure is directed to a driving assistant method and system for an electric vehicle, by which when the electric vehicle is started up, a battery energy safe driving region is calculated, and is dynamically presented to a user through a user interface. In this way, a problem that none charging station and none battery exchange station are located around when the battery of the electric vehicle is required to be charged is avoided.

The disclosure is directed to a driving assistant method for an electric vehicle, and a driving assistant system for the electric vehicle, which can effectively use electricity supplying equipment information, electricity supplying status and real-time information to provide a suitable electricity supplying planning for a driver, and provide a flexible driving suggestion according to driver's demand.

The disclosure provides a driving assistant method for an electric vehicle, which includes the following steps. When the electric vehicle is started up, a battery energy safe driving region of the electric vehicle is calculated and displayed according to driving information of the electric vehicle. The driving information includes battery information of the electric vehicle. The battery energy safe driving region is updated dynamically according to the driving information of the electric vehicle.

The battery energy safe driving region is a region in which the electric vehicle is capable of driving randomly without leading incapability for electricity supplying. Furthermore, the battery energy safe driving region is defined as the followings. At least one electricity supplying station is selected, and the at least one electricity supplying station is taken as a center to calculate a returnable region of the electric vehicle under a current battery energy according to the driving information to serve as at least one safe coverage region, and the at least one safe coverage region is united to obtain a united region to serve as the battery energy safe driving region.

The driving assistant method for the electric vehicle further includes following steps. When a position of the electric vehicle exceeds the battery energy safe driving region, a battery energy warning driving region of the electric vehicle is displayed, and at least one electricity supplying station within the battery energy warning driving region is displayed. The battery energy warning driving region is defined as a maximum region outside the battery energy safe driving region capable of being reached by the electric vehicle. The battery energy warning driving region is updated dynamically according to the driving information.

The battery energy warning driving region is calculated as followings. At least one electricity supplying station is taken as a center to calculate a maximum region capable of being reached by the electric vehicle under current battery energy according to the driving information to serve as at least one warning coverage region, and the at least one warning coverage region is united to obtain a united region to serve as the battery energy warning driving region.

The disclosure provides a driving assistant method for an electric vehicle, which includes an electricity supplying station selecting step, a coverage region calculating step, a dynamic updating step and a display step. In the coverage region calculating step, energy consumption per unit distance of the electric vehicle is calculated according to driving information of the electric vehicle, and at least one electricity supplying station is taken as a center to estimate a region that the electric vehicle is capable of returning back along different directions to serve as at least one safe coverage region, and estimate a region that the electric vehicle is capable of reaching to serve as at least one warning coverage region, and the at least one safe coverage region is united to obtain a battery energy safe driving region, and the at least one warning coverage region is united to obtain a battery energy warning driving region. In the display step, the updated battery energy safe driving region, and the updated battery energy warning driving region are displayed.

The disclosure provides a driving assistant system for an electric vehicle, which includes a driving information collecting unit, an input unit, a selection region calculating unit, a coverage region calculating unit and a display device. The driving information collecting unit receives driving information through at least one sensor installed in the electric vehicle. The driving information includes at least one of battery information, positioning information, map information and traffic information of the electric vehicle. A user inputs trip related information through the input unit, where the trip related information includes a first pre-proposed selection region. The selection region calculating unit is connected to the driving information collecting unit and the input unit for receiving the first pre-proposed selection region or calculating a second pre-proposed selection region according to the driving information as a selection region, and finding at least one electricity supplying station within the selection region. The coverage region calculating unit is connected to the driving information collecting unit, the input unit and the selection region calculating unit, and takes the at least one electricity supplying station as a center to calculate a region that the electric vehicle is capable of returning back under current battery energy of the electric vehicle according to the driving information to serve as at least one safe coverage region, and calculate a maximum region capable of being reached by the electric vehicle to serve as at least one warning coverage region. The at least one safe coverage region is united to obtain a battery energy safe driving region, and the at least one warning coverage region is united to obtain a battery energy warning driving region. The display device is connected to the driving information collecting unit, the input unit and the coverage region calculating unit for displaying the battery energy safe driving region and the battery energy warning driving region.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

First Exemplary Embodiment

Figure 1:
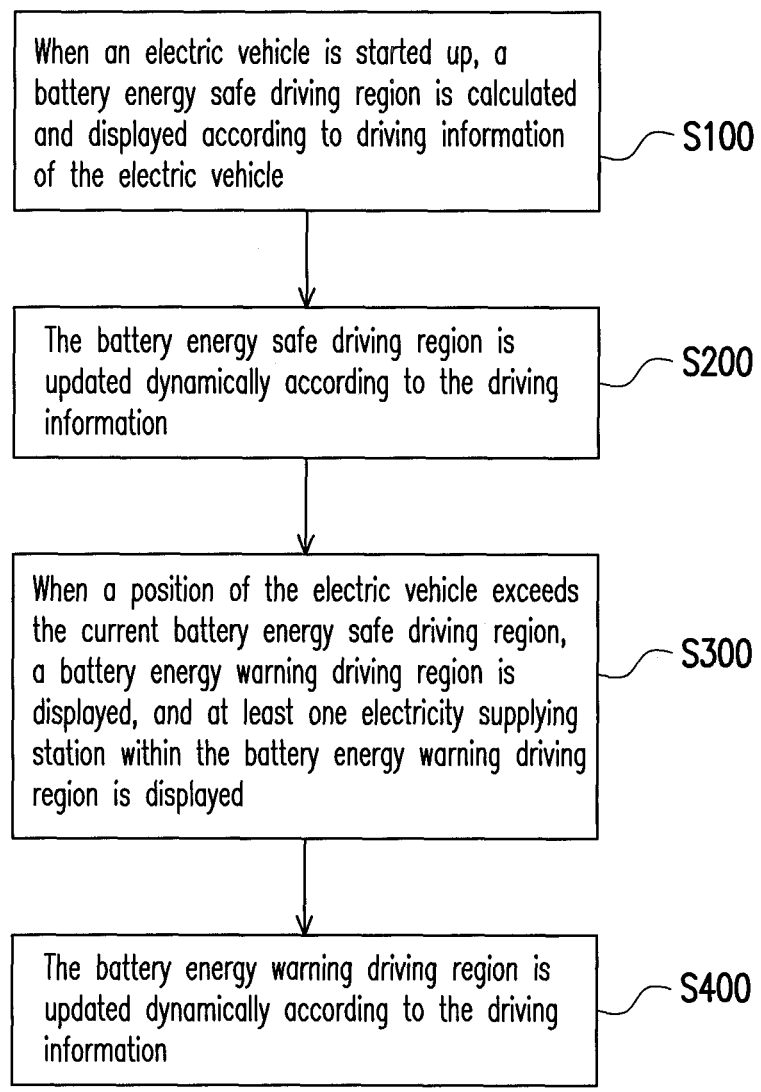
FIG. 1 is a flowchart illustrating a driving assistant method for an electric vehicle according to a first exemplary embodiment of the disclosure.
Figure 2:
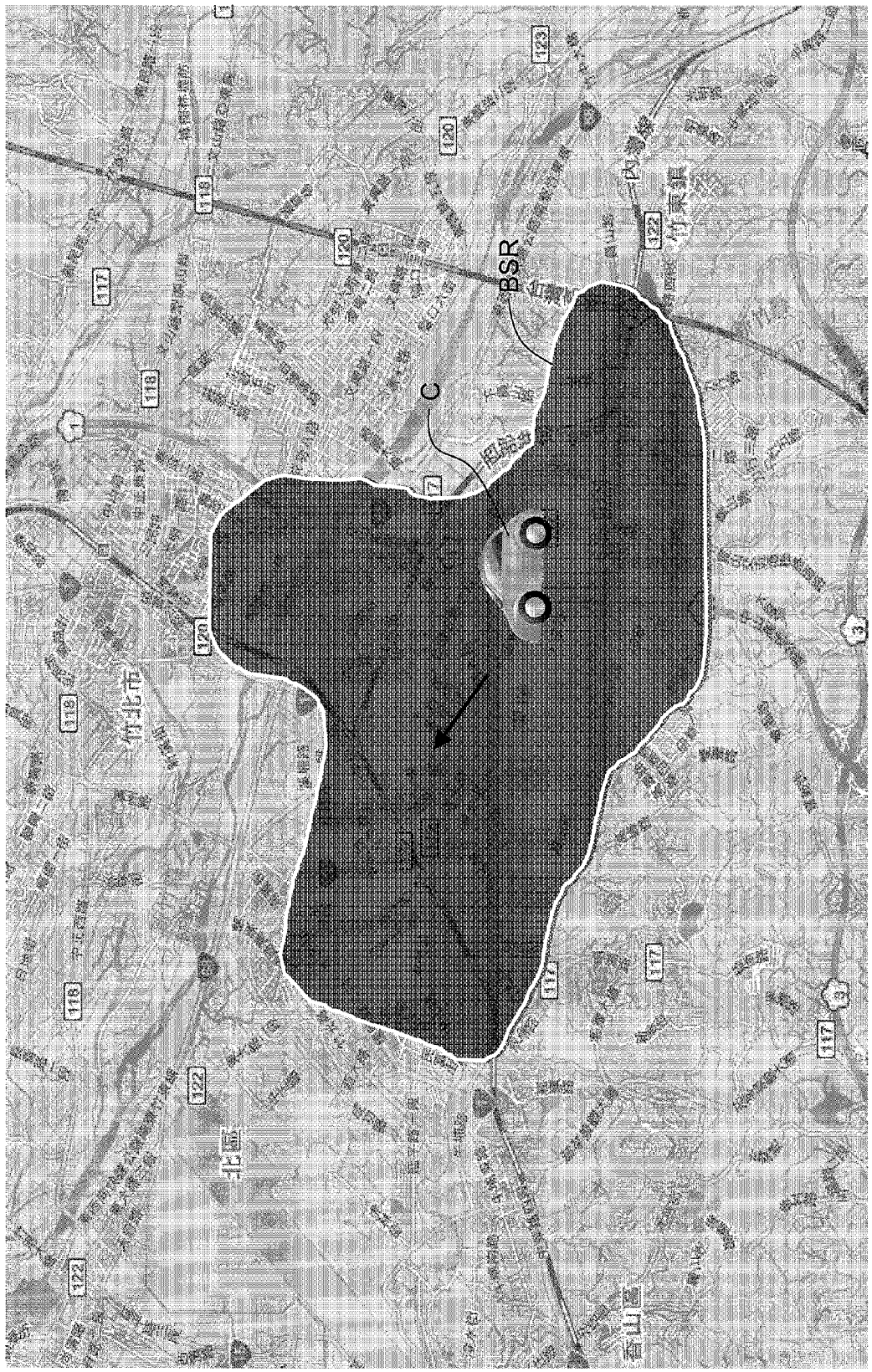
FIG. 2-FIG. 4 are operational schematic diagrams of a driving assistant method for an electric vehicle according to the first exemplary embodiment of the disclosure.
Figure 3:
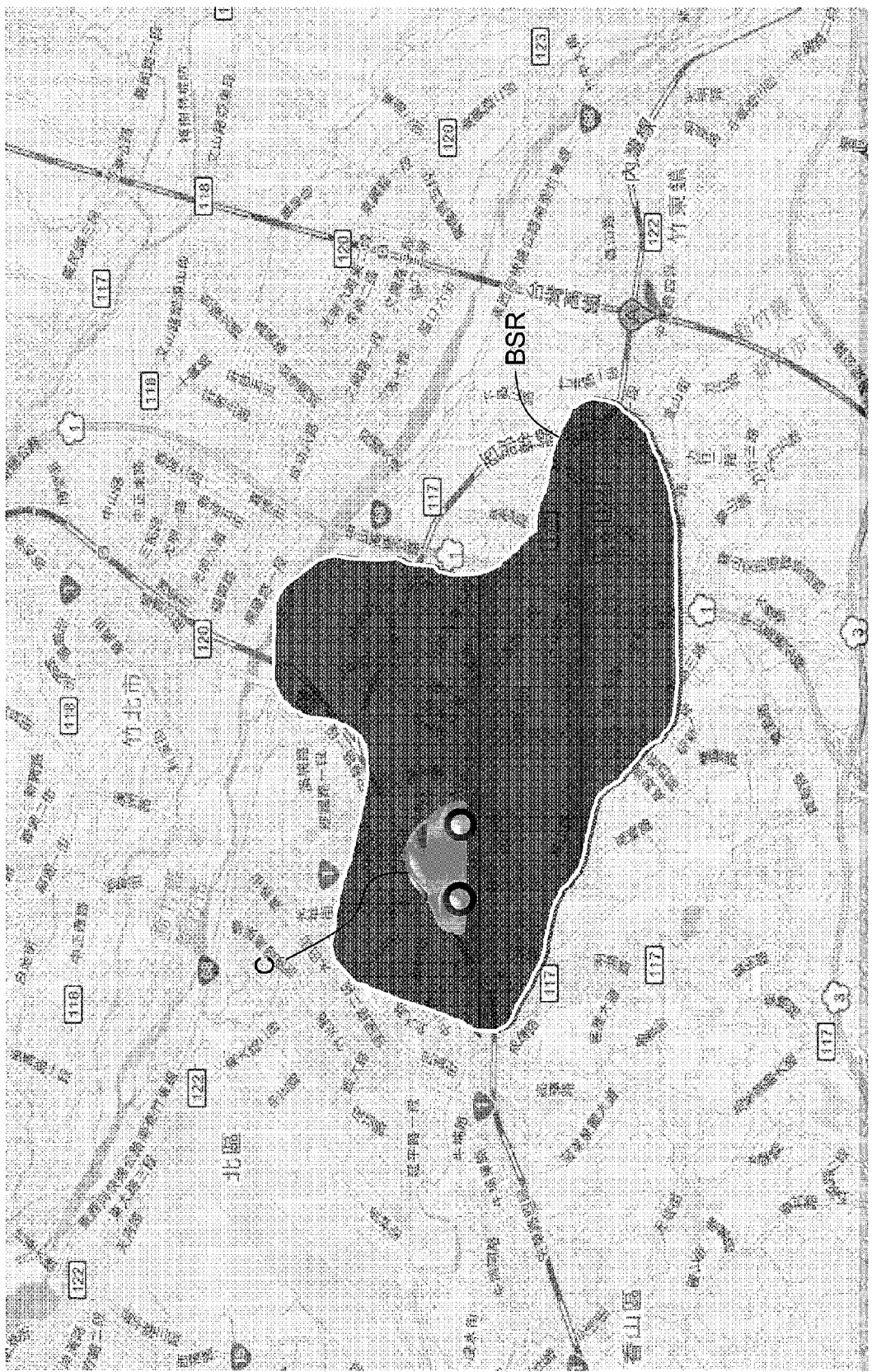
Figure 4:
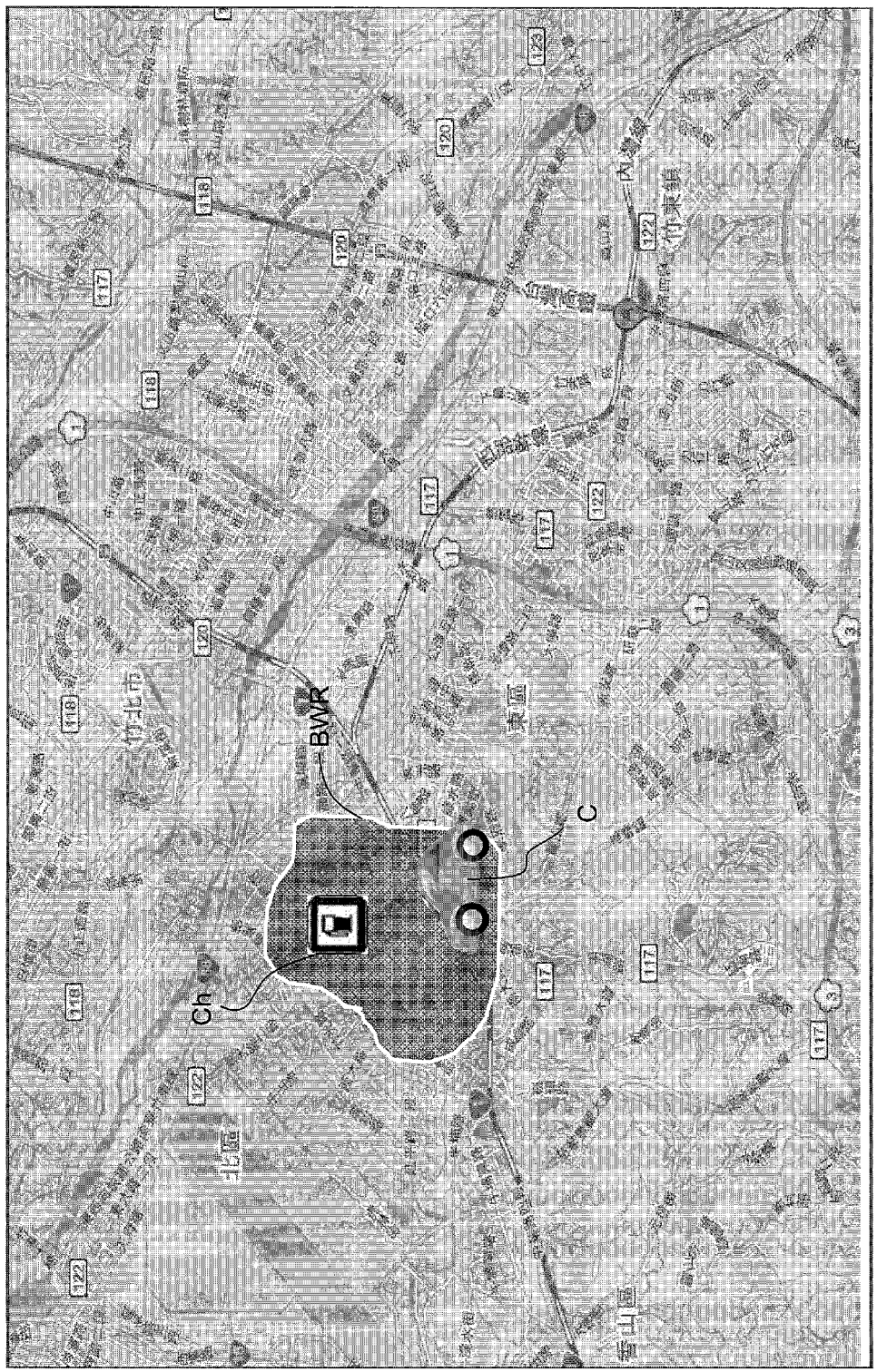

Referring to FIG. 1 and FIG. 2-FIG. 4, FIG. 1 is a flowchart illustrating a driving assistant method for an electric vehicle according to a first exemplary embodiment of the disclosure, and FIG. 2-FIG. 4 are operational schematic diagrams of a driving assistant method for an electric vehicle according to the first exemplary embodiment of the disclosure.

The driving assistant method for an electric vehicle of the disclosure includes following steps.

In step S100, as shown in FIG. 2, when an electric vehicle C is started up, a battery energy safe driving region BSR of the electric vehicle C is calculated and displayed according to driving information of the electric vehicle C, for example, battery information of the electric vehicle C (including at least one of electricity consumption status information, remained battery energy information and battery aging information of the electric vehicle C). Moreover, the driving information may include at least one of vehicle weight information, positioning information, map information (including terrain information) and traffic information (including real-time traffic information) of the electric vehicle C. The battery energy safe driving region BSR is defined as a region in which the electric vehicle C can drive randomly without leading incapability for electricity supplying. For example, in the battery energy safe driving region BSR, the electric vehicle C has enough battery energy to return back to an electricity supplying station (a charging station, a battery exchange station or a home charging place) within such region. The method of determining the battery energy safe driving region of the electric vehicle is described in detail later.

In step S200, as shown in FIG. 3, the battery energy safe driving region BSR is updated dynamically according to the driving information of the electric vehicle C, for example, the battery energy safe driving region BSR is calculated every a certain time interval.

In step S300, as shown in FIG. 4, when a position of the electric vehicle C exceeds the current battery energy safe driving region BSR, a battery energy warning driving region BWR of the electric vehicle C is calculated and displayed, and at least one electricity supplying station Ch within the battery energy warning driving region BWR is displayed. The battery energy warning driving region BWR is defined as a maximum region outside the battery energy safe driving region BSR capable of being reached by the electric vehicle C. The method of determining the battery energy warning driving region of the electric vehicle is described in detail later.

In step S400, the battery energy warning driving region is updated dynamically according to the driving information of the electric vehicle C, for example, the battery energy warning driving region BWR is calculated every a certain time interval.

Figure 5:
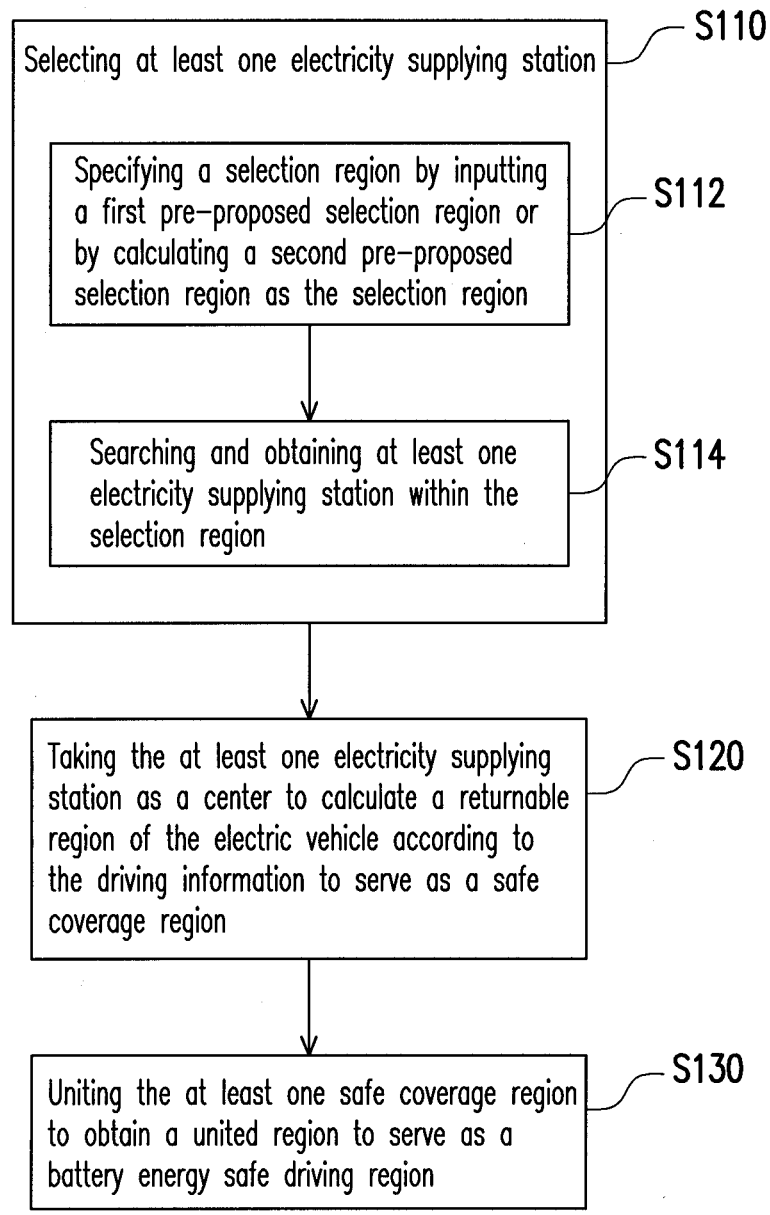
FIG. 5-FIG. 7 are flowcharts illustrating methods of calculating a battery energy safe driving region and a battery energy warning driving region of an electric vehicle according to the first exemplary embodiment of the invention.
Figure 6:
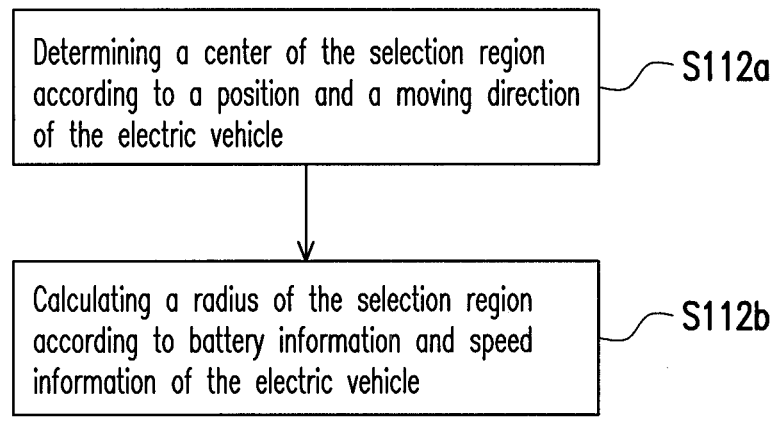
Figure 7:
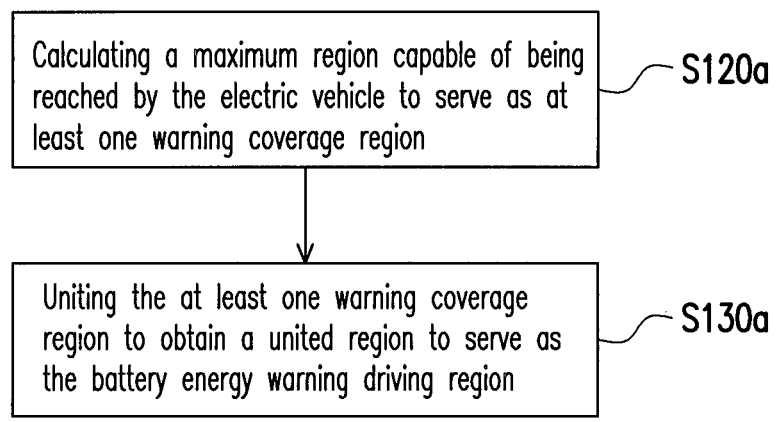

Referring to FIG. 5-FIG. 7, FIG. 8A-FIG. 8C and FIG. 9-FIG. 11, where FIG. 5-FIG. 7 are flowcharts illustrating methods of calculating the battery energy safe driving region and the battery energy warning driving region of the electric vehicle according to the first exemplary embodiment of the invention, and FIG. 8A-FIG. 8C and FIG. 9-FIG. 11 are operational schematic diagrams of determining the battery energy safe driving region and the battery energy warning driving region of the electric vehicle according to the first exemplary embodiment of the invention.

In the step S100, the method of determining the battery energy safe driving region of the electric vehicle includes following steps.

Figure 8A:
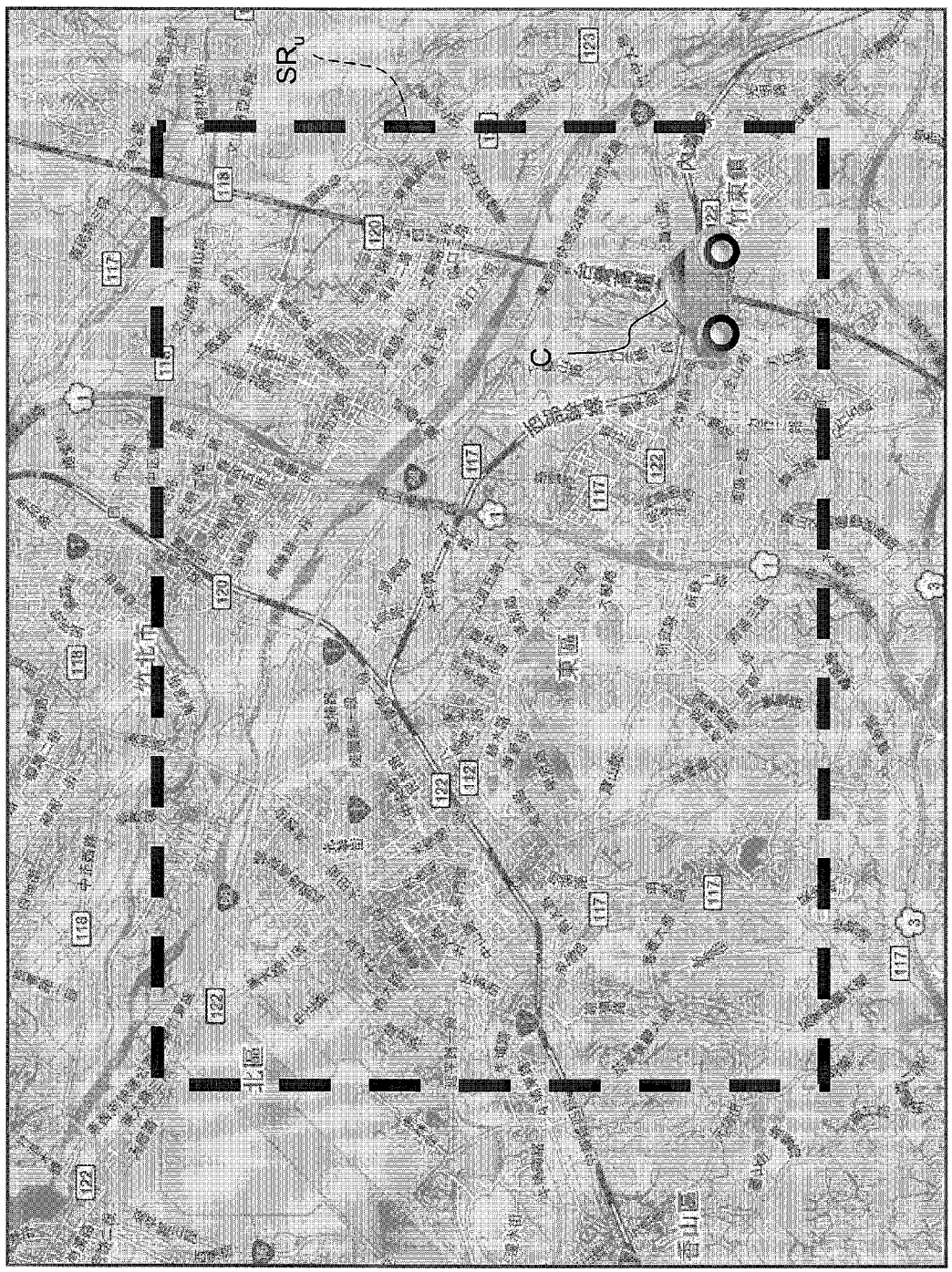
FIG. 8A-FIG. 8C and FIG. 9-FIG. 11 are operational schematic diagrams of determining the battery energy safe driving region and the battery energy warning driving region of the electric vehicle according to the first exemplary embodiment of the invention.
Figure 8B:
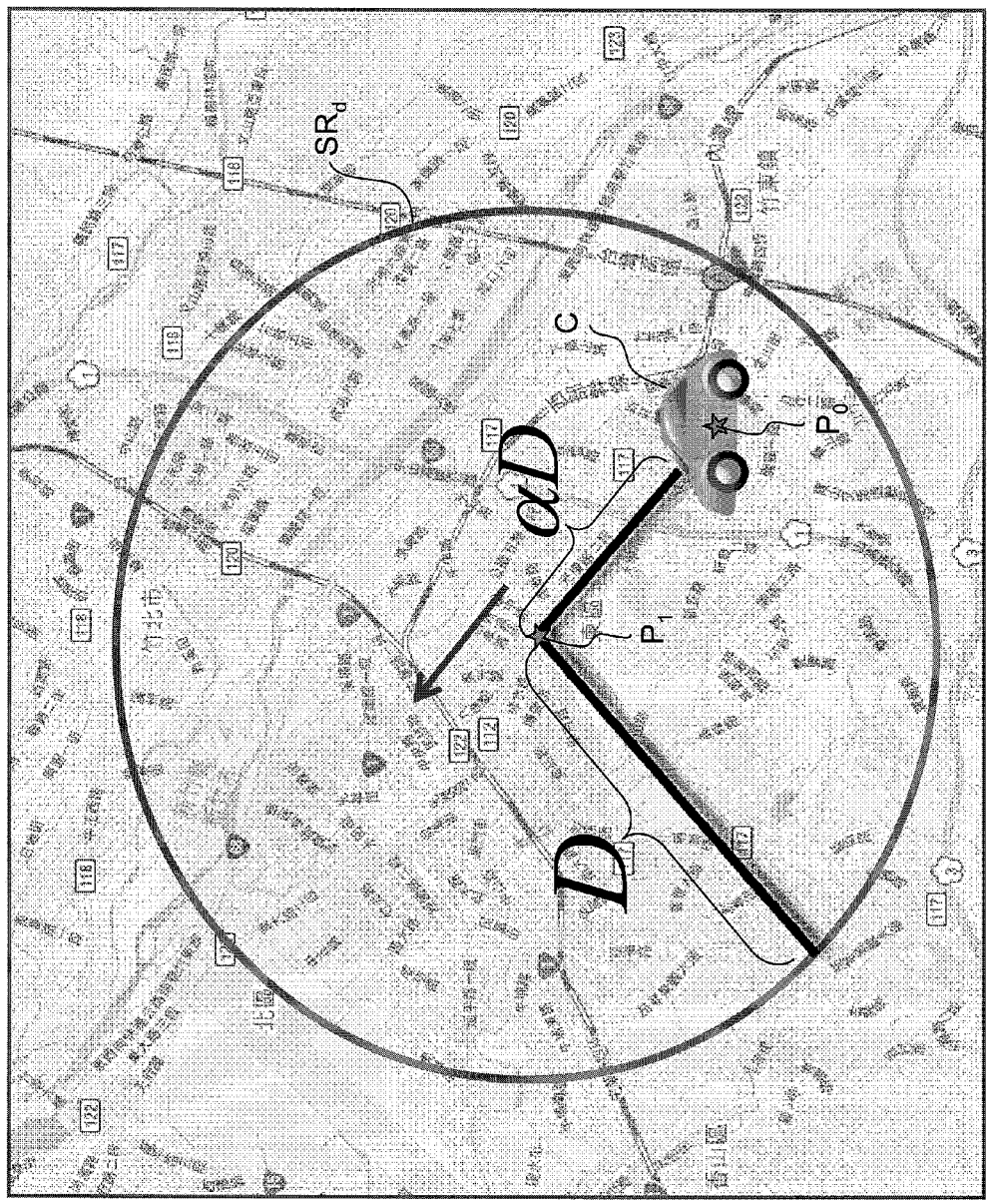
Figure 8C:
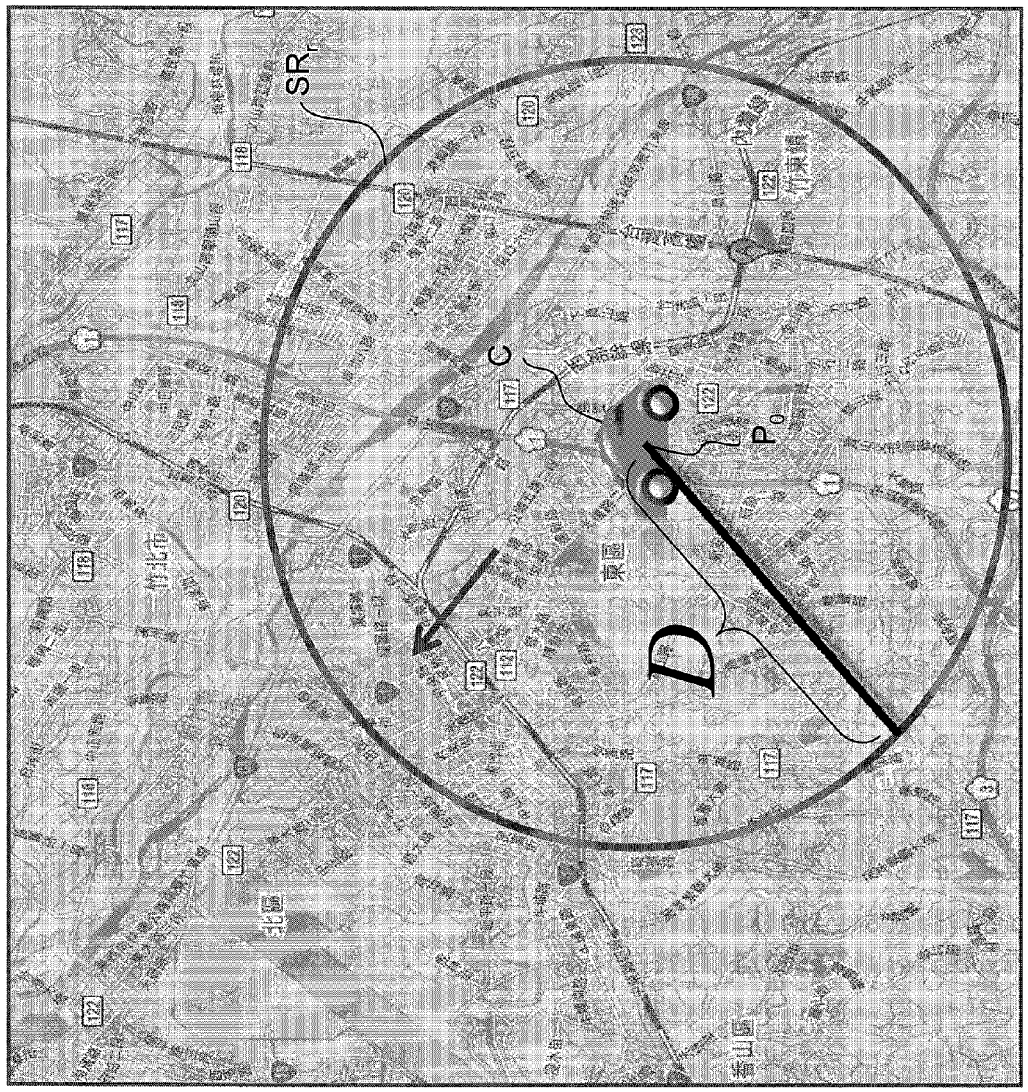
Figure 9:
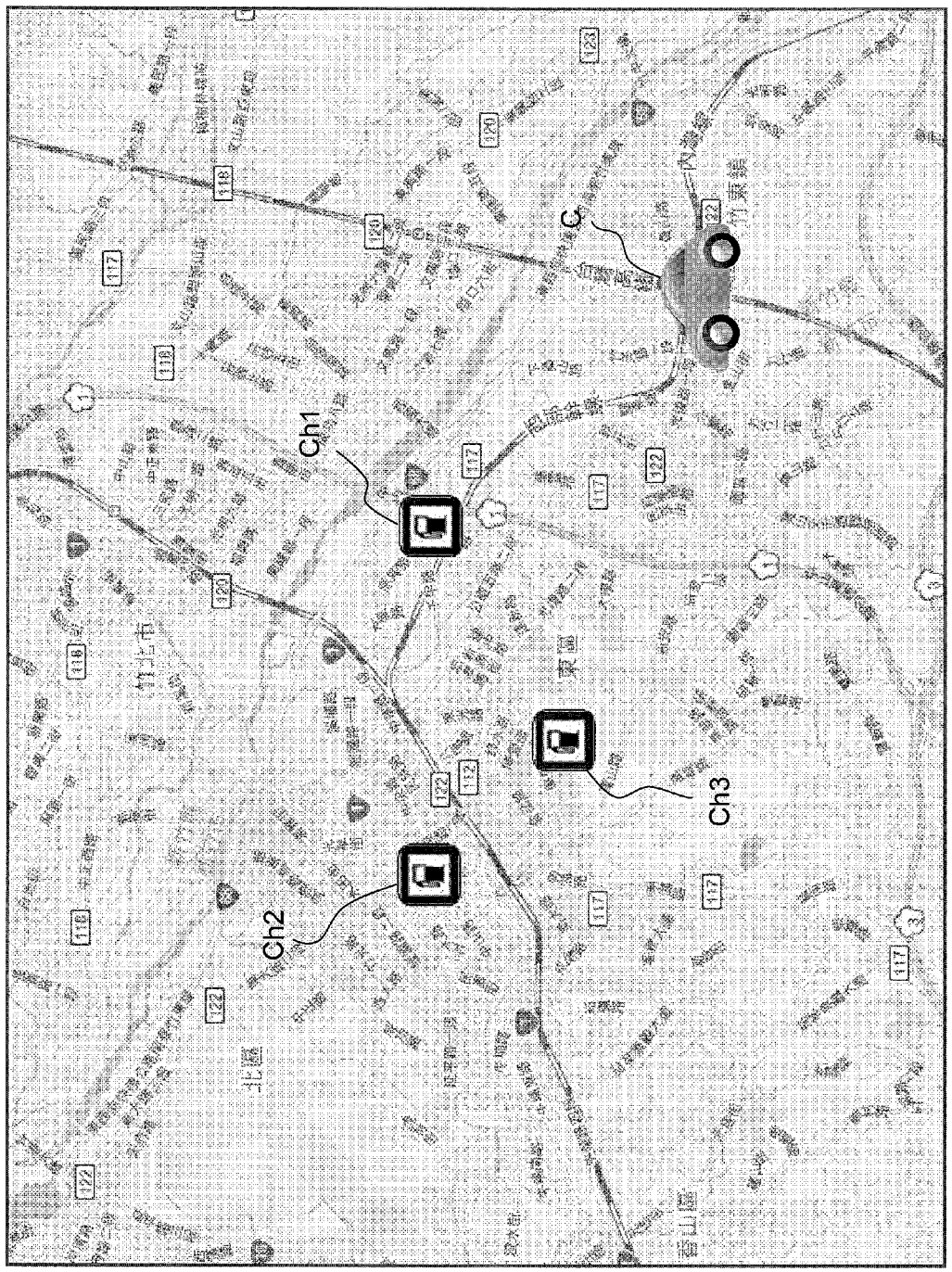
Figure 10:
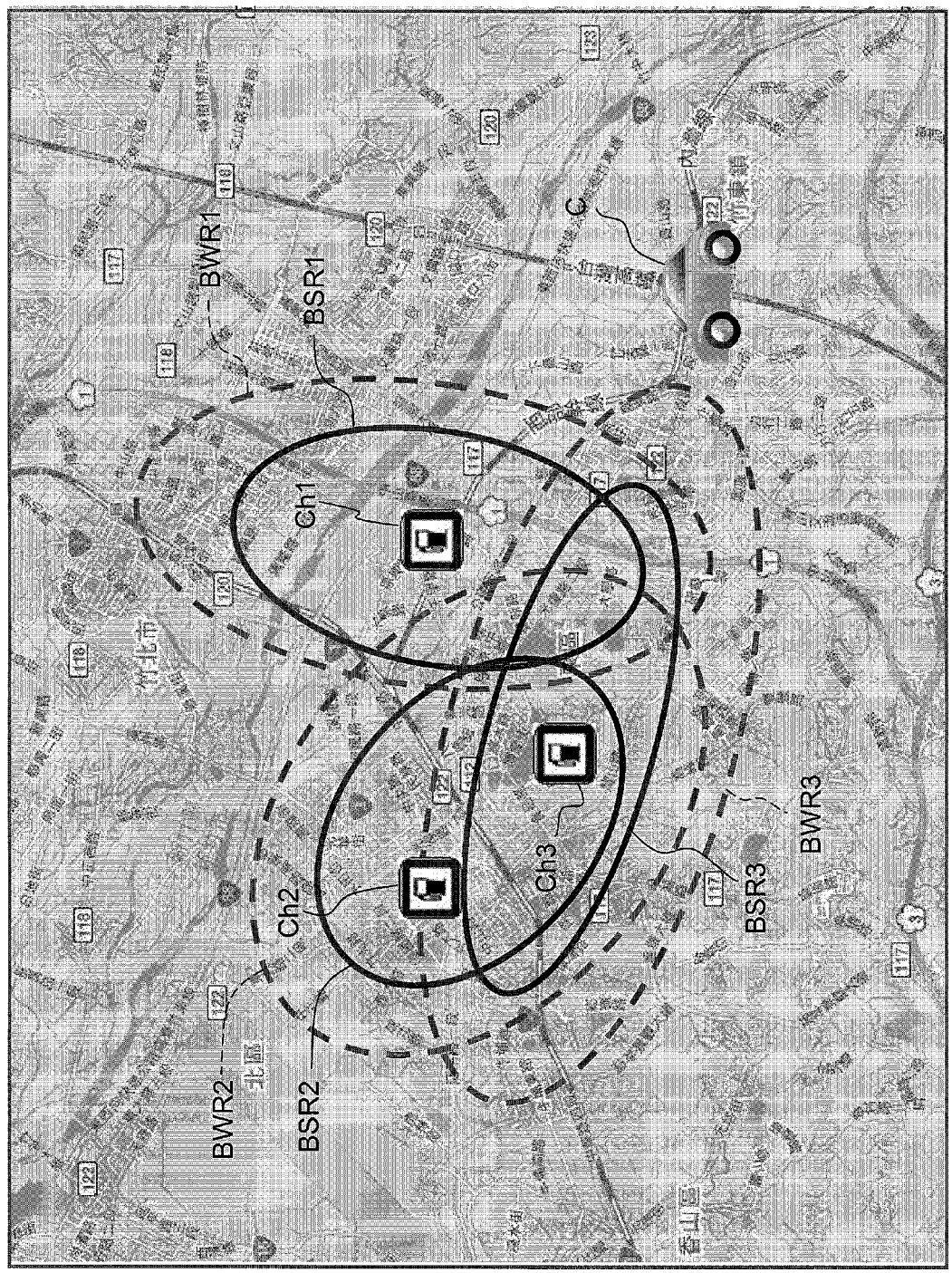

In step S110, at least one electricity supplying station is selected, by which a selection region is set (step S112 with reference of FIGS. 8A-8C), and at least one electricity supplying stations Ch1, Ch2 or Ch3 within the selection region are found (step S114 with reference of FIG. 9). In the example of FIG. 9, three electricity supplying stations are found, and the number of the electricity supplying stations is subject to an actual finding number. At least one electricity supplying station is found according to the definition of the battery energy safe driving region BSR.

The selection region in the step S110 can be determined by inputting through a user (shown in FIG. 8A) or calculated according to the driving information (shown in FIG. 8B or FIG. 8C). When the selection region is determined by the user, as that shown in FIG. 8A, the user can select a first pre-proposed region $SR_u$ (u represents the user) through an input interface frame to serve as the selection region. When the selection region is calculated according to the driving information, a second pre-proposed selection region can be determined according to a position and speed information of the electric vehicle C to serve as the selection region, furthermore a moving direction of the electric vehicle can also be considered to determine the selection region. In calculating the selection region, for example, a center of the second pre-proposed selection region is determined according to the position and the moving direction of the electric vehicle C (step S112a), for example, when a driving behaviour of the electric vehicle C is random (no particular destination, a free ride, hang around, a driving direction is not particularly planned, etc.), a current position Po of the electric vehicle C is taken as the center, and a radius of the second pre-proposed selection region is calculated according to the battery information and speed information of the electric vehicle C (step S112b), for example, a current speed V of the electric vehicle C times a predetermined time T (for example, a battery buffering time, i.e. a battery remaining time) to serve as a radius D of the second pre-proposed selection region, so as to obtain a the selection region $SR_r$ (r represents random). For another example, when the driving behaviour of the electric vehicle C is directional (having a specific destination or having a specific direction planning, etc.), the center of the second pre-proposed selection region is determined according to the position, the moving direction, the battery information and the speed information of the electric vehicle C, and a radius of the second pre-proposed selection region is calculated to serve as the selection region. For example, an estimated position P1 of the electric vehicle C after a time t (0<t<T) is taken as the center of the second pre-proposed selection region, and the current speed V times the predetermined time T (for example, the battery buffering time, i.e. the battery remaining time) is taken as the radius D of the second pre-proposed selection region to obtain a selection region $SR_d$ (d represents directional).

In step S120, the at least one electricity supplying stations Ch1, Ch2 and Ch3 found within the selection region are taken as centers to calculate regions that the electric vehicle C is capable of returning back to the at least one electricity supplying stations Ch1, Ch2 and Ch3 under a current battery energy of the electric vehicle C according to the driving information to serve as at least one safe coverage regions BSR1, BSR2 and BSR3.

Figure 11:
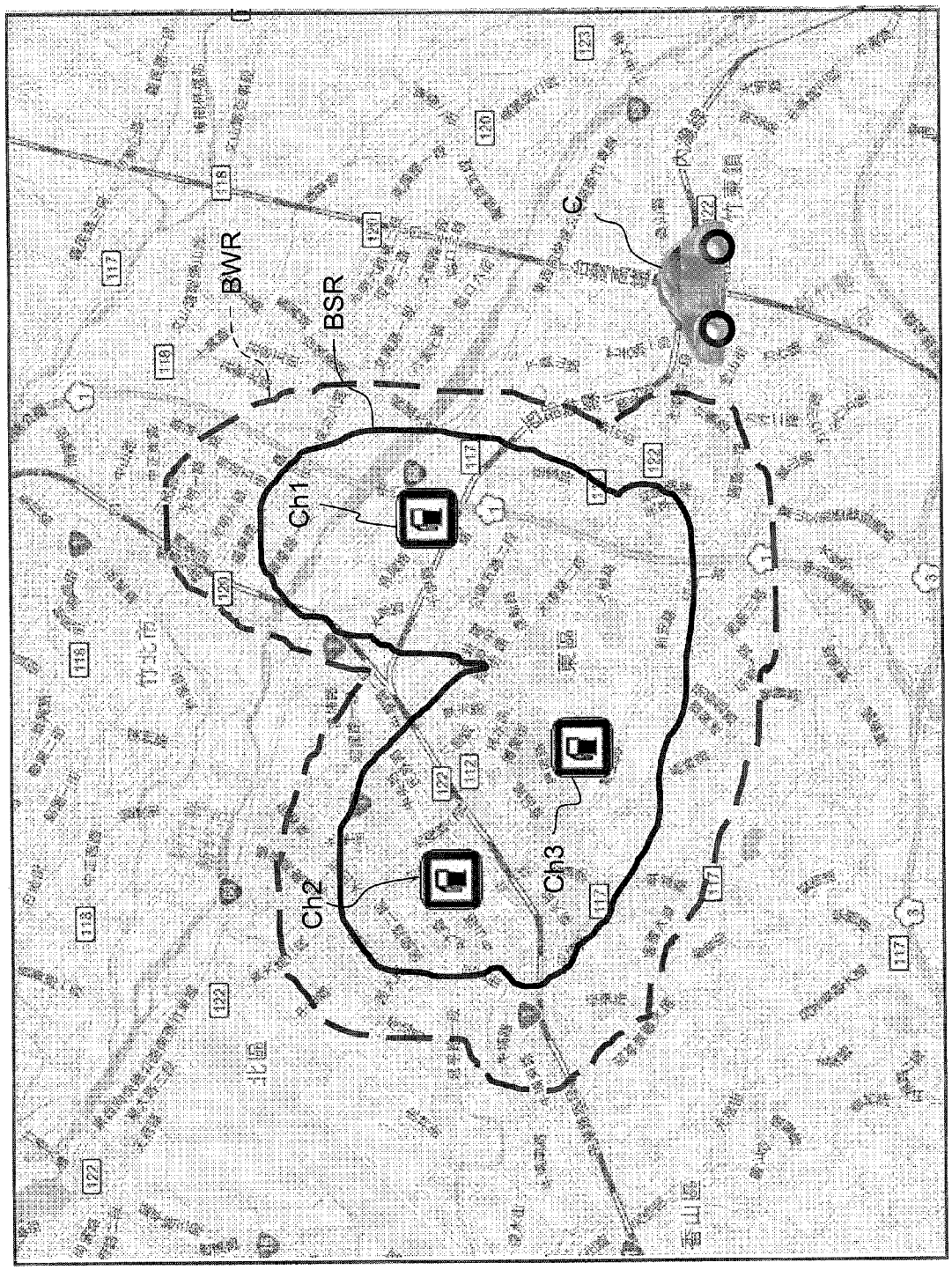

In step S130, the at least one safe coverage regions BSR1, BSR2 and BSR3 are united to obtain a united region to serve as the battery energy safe driving region BSR (shown in FIG. 11).

In the aforementioned step S300, a method of determining the battery energy warning driving region of the electric vehicle further includes following steps based on the steps S110, S120 and S130.

In the step S120, a following calculation is added. The at least one electricity supplying stations Ch1, Ch2 and Ch3 are taken as centers to calculate maximum regions (shown as dot line regions of FIG. 10) capable of being reached by the electric vehicle C under the current battery energy according to the driving information to serve as at least one warning coverage region BWR1, BWR2 and BWR3 (step S120a).

In the step S130, a following calculation is added. The at least one warning coverage region BWR1, BWR2 and BWR3 are united to obtain a united region of FIG. 11 to serve as the battery energy warning driving region BWR (step S130a).

The above example of determining the second pre-proposed selection region according to the driving information (steps S112a and S112b) is further described as the followings.

When the driving behaviour of the electric vehicle C is directional, the radius of the second pre-proposed selection region $SR_r$ is set as $D = T \times V$ ... (equation 1), where V is a current speed (with a unit of Km/hr), and T is a battery buffering time (i.e. the battery remaining time, with a unit of hr), and $$T = \frac{Q \times kv}{P \times V} \quad \text{(equation 2)}$$

Where, Q is remained battery energy (with a unit of WH), kv is a speed electricity consumption coefficient, and P is electricity consumption per unit distance obtained according to data of original equipment manufacturer (with a unit of WH/km).

When the driving behaviour of the electric vehicle C is non-directional, after a time t (with a unit of hr), a moving distance of the electric vehicle C is $d = \alpha D$ ... (equation 3). In this way, the estimated position P1 of the electric vehicle C after the time t is obtained, where α is a moving distance ratio, and $$\alpha = \frac{Q - t \times Pc}{Q}, 0 \leq \alpha \leq 1, 0 \leq t \leq T, \quad \text{(equation 4)}$$

wherein Pc is current electricity consumption of the electric vehicle C (with a unit of W), in the aforementioned equations, the same parameters are represented by the same symbols, and detailed descriptions thereof are not repeated.

Second Exemplary Embodiment

Figure 12:
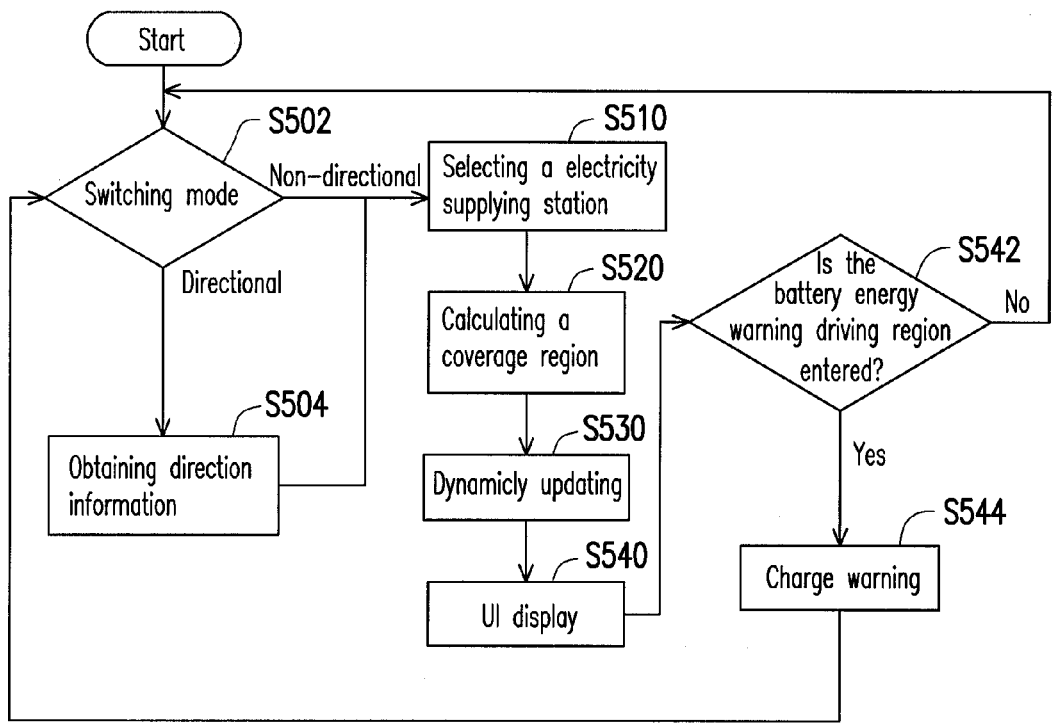
FIG. 12 is a flowchart illustrating a driving assistant method for an electric vehicle according to a second exemplary embodiment of the disclosure.

Referring to FIG. 12, FIG. 12 is a flowchart illustrating a driving assistant method for an electric vehicle according to a second exemplary embodiment of the disclosure.

In a step S510 of selecting the electricity supplying stations (the same to the step S110 of the first exemplary embodiment), a purpose thereof is to estimate a moving region of the electric vehicle C to obtain a position of at least one electricity supplying station capable of supplying electricity, and a selecting method thereof is as that described in the step S110 of the first exemplary embodiment, by which besides specified by the user, there are two operation modes of a directional mode and a non-directional mode. Therefore, before the step of selecting the electricity supplying station, a mode switching step S502 is added, and if the direction mode is switched, direction information can be further obtained (step S504), and the direction information is obtained through a global positioning system (GPS), a gyroscope, or other similar equipments capable of providing the direction information.

A step S520 of calculating the coverage region is the same to the steps S120, S120a, S130 and S130a of the first exemplary embodiment, by which after the electricity supplying stations are selected (i.e. after the positions of the electricity supplying stations capable of supplying electricity are obtained in the step S510), each electricity supplying station is taken as a center to calculate the battery energy safe driving region BSR and the battery energy warning driving region BWR according to different parameters, for example, remained battery energy, battery status, geographic information and traffic information, etc.

To ensure the electric vehicle C to reach the electricity supplying station, the battery energy safe driving region BSR and the battery energy warning driving region BWR are required to be dynamically updated (step S530), i.e. the battery energy safe driving region BSR and the battery energy warning driving region BWR are calculated every a certain time interval.

In a user interface (UI) display step S540, the electricity supplying stations (and electricity supplying equipment information) and the coverage regions (the battery energy safe driving region BSR and the battery energy warning driving region BWR) obtained according to the steps S510 and S520 are integrated with a map for displaying to the user.

After the UI display step S540, a determination step can be added to monitor whether the electric vehicle C enters the battery energy warning driving region BWR at any time (or every a certain time interval). If the electric vehicle C enters the battery energy warning driving region BWR, a charge warning step S544 is executed. Otherwise, as shown in step S530, the battery energy safe driving region BSR and the battery energy warning driving region BWR are dynamically updated, i.e. the battery energy safe driving region BSR and the battery energy warning driving region BWR are recalculated every a certain time interval.

In the charge warning step S544, the user is reminded to charge the electric vehicle C, and now the charge navigation function can be switched.

Figure 13:
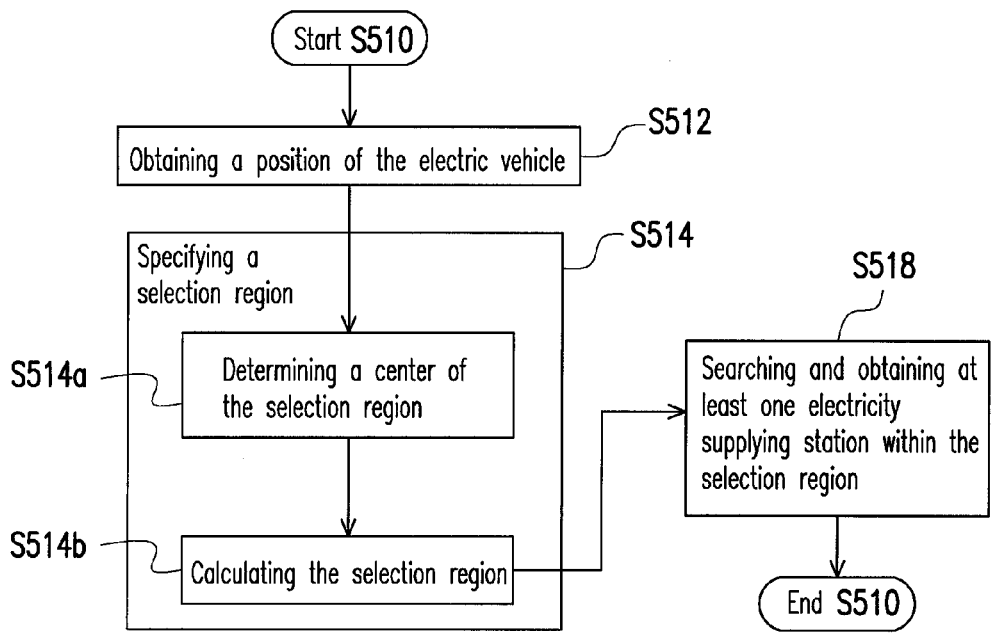
FIG. 13 is a flowchart illustrating an example of a step of selecting electricity supplying stations of FIG. 12.

Referring to FIG. 13, FIG. 13 is a flowchart illustrating an example of the step of selecting the electricity supplying stations.

The GPS is used to obtain a position of the electric vehicle C (step S512). Then, a selection region is set (step S514), and a setting method thereof is as that described in the step S112 of the first exemplary embodiment, which can be specified by inputting through a user or determined according to the driving information. In FIG. 13, the second pre-proposed selection region is determined according to the driving information, by which according to whether the driving behaviour is directional (the aforementioned mode switching step S502), a center of the second pre-proposed selection region is determined (step S514a, which is the same to the step S112a of the first exemplary embodiment), and the second pre-proposed selection region is calculated to serve as the selection region (step S514b, which is the same to the step S112b of the first exemplary embodiment). After the steps S514a and S514b of setting the selection region are completed, at least one electricity supplying station within the selection region is found (step S518). In this way, at least one electricity supplying station (and electricity supplying equipment information thereof) within the selection region is obtained, and a following electricity supplying equipment list is accordingly established to facilitate calculating the coverage regions.

| Electricity supplying equipment list | | | | |
|---|---|---|---|---|
| Equipment code | Latitude and longitude | Area | Equipment utilization status | Remark |
| 1 | X, Y | Hsinchu-East | 5/8 | |

In the above electricity supplying equipment list, status of the electricity supplying equipments at the found electricity supplying station is listed, for example, according to the above list, one electricity supplying station is found, and a latitude and longitude, an area, and an equipment utilization status (for example, 5 of 8 equipments are in use, etc.) thereof are obtained.

Figure 14:
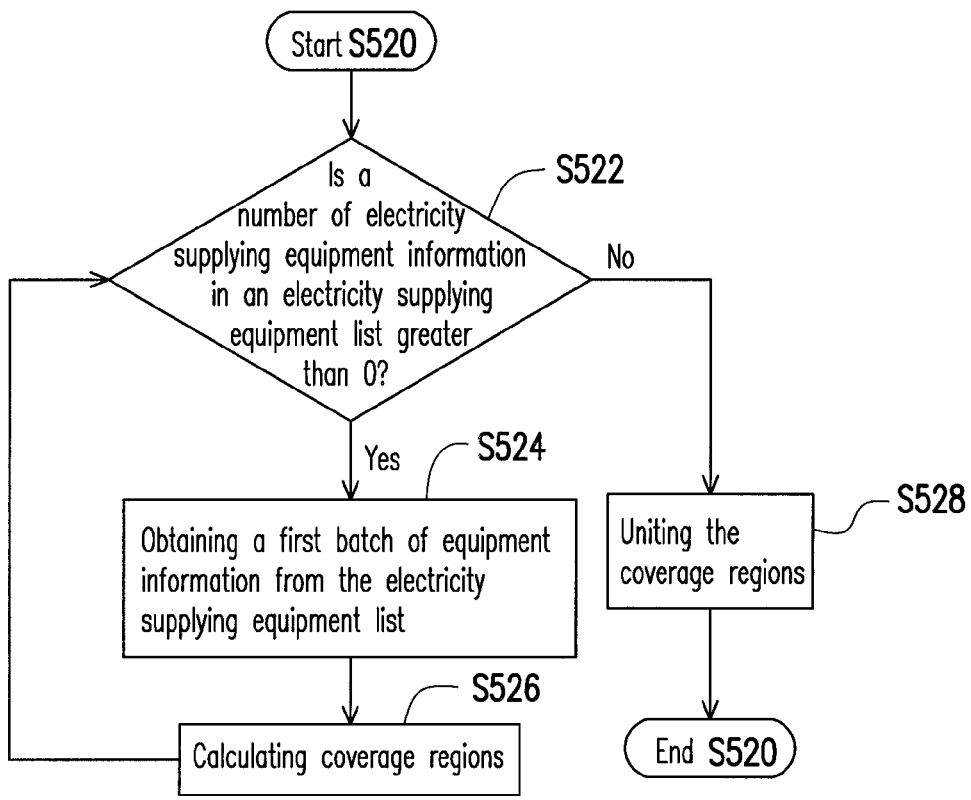
FIG. 14 is a flowchart illustrating an example of a step S520 of calculating a coverage region in FIG. 12.

Referring to FIG. 14, FIG. 14 is a flowchart illustrating an example of the step S520 of calculating the coverage regions.

It is determined whether the electricity supplying equipment list has the electricity supplying equipment information (step S522). If the electricity supplying equipment information exists, the electricity supplying equipment information is sequentially obtained (step S524), and the safe coverage region and the warning coverage region are calculated (step S526, which is the same to the steps S120 and S120a of the first exemplary embodiment). After the equipment information is obtained, such equipment information is removed from the electricity supplying equipment list to save a calculation space, and if the electricity supplying equipment list has none electricity supplying equipment information, a step S528 is executed.

The step S526 of calculating the safe coverage region and the warning coverage region is as that described in the steps S120 and 120a of the first exemplary embodiment, by which each of the electricity supplying stations in the electricity supplying equipment list is taken as a center to calculate surrounding effective driving regions (a returnable region, and a maximum reachable region). The following step S528 of uniting the coverage regions is the same to the steps S130 and 130a of the first exemplary embodiment, and detailed descriptions thereof is not repeated.

In the calculation of the step S520, besides the battery status information is considered, the vehicle weight information, the terrain information, the real-time traffic information and electricity utilization status information of the electric vehicle can also be taken into consideration.

Figure 15:
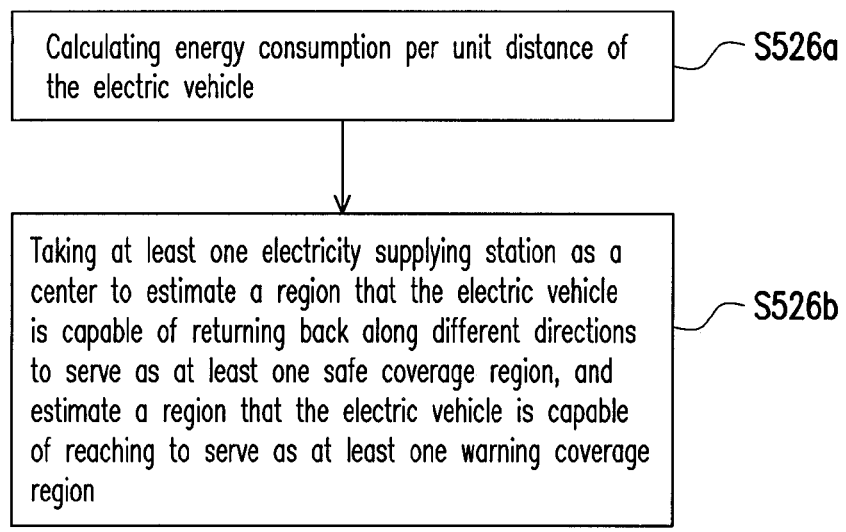
FIG. 15 is a flowchart illustrating an example of calculating a safe coverage region and a warning coverage region according to the second exemplary embodiment of the disclosure.

Referring to FIG. 15, FIG. 15 is a flowchart illustrating an example of calculating the safe coverage region and the warning coverage region.

Energy consumption per unit distance of the electric vehicle is calculated according to the driving information of the electric vehicle C (step S526a), and at least one electricity supplying station is taken as a center to estimate a region that the electric vehicle is capable of returning back along different directions to serve as at least one safe coverage region, and estimate a region that the electric vehicle is capable of reaching to serve as at least one warning coverage region (step S526b).

For example, in the step S526a, the energy consumption P' per unit distance of the electric vehicle can be obtained according to an equation of P'=P/ki, wherein P is the energy consumption per unit distance obtained according to the data of the original equipment manufacturer of the electric vehicle C, ki is a vehicle status-related electricity consumption coefficient, for example, a battery aging energy consumption coefficient kb. Moreover, other electricity consumption coefficients can also be taken into consideration, for example, a weight electricity consumption coefficient kw, a speed electricity consumption coefficient kv, and other electricity consumption coefficients, etc., and ki can be any one of the above electricity consumption coefficients or a product of any two or more of the above electricity consumption coefficients (i.e. a product of at least one of the coefficients).

For example, in case of considering one coefficient, ki=kb or kw or kv or other electricity consumption coefficient.

In case of considering two coefficients, ki=kb×kw or kb×kv or kv×kw, or a product of any two of the coefficients.

In case of considering three coefficients, ki=kb'kw×kv or a product of any three of the coefficients.

Deduced by analogy, ki can be a product of multiple coefficients. Each electricity consumption coefficient can be obtained according to existing documents or experiment data, or can be obtained through experiment. For example, referring to an article in Nano-lithium Battery Technology Mar. 16, 2006 authored by Mr. Chen jinming, it is known that the battery aging electricity consumption coefficient kb=0.96−$10^{-6}$ $x^2$−$2 \cdot 10^{-4}$x (wherein x represents charge and discharge times), and referring to China urban construction industry standards, it is known that the weight electricity consumption coefficient kw=1.0875 (current weight/empty weight−1).

Figure 16:
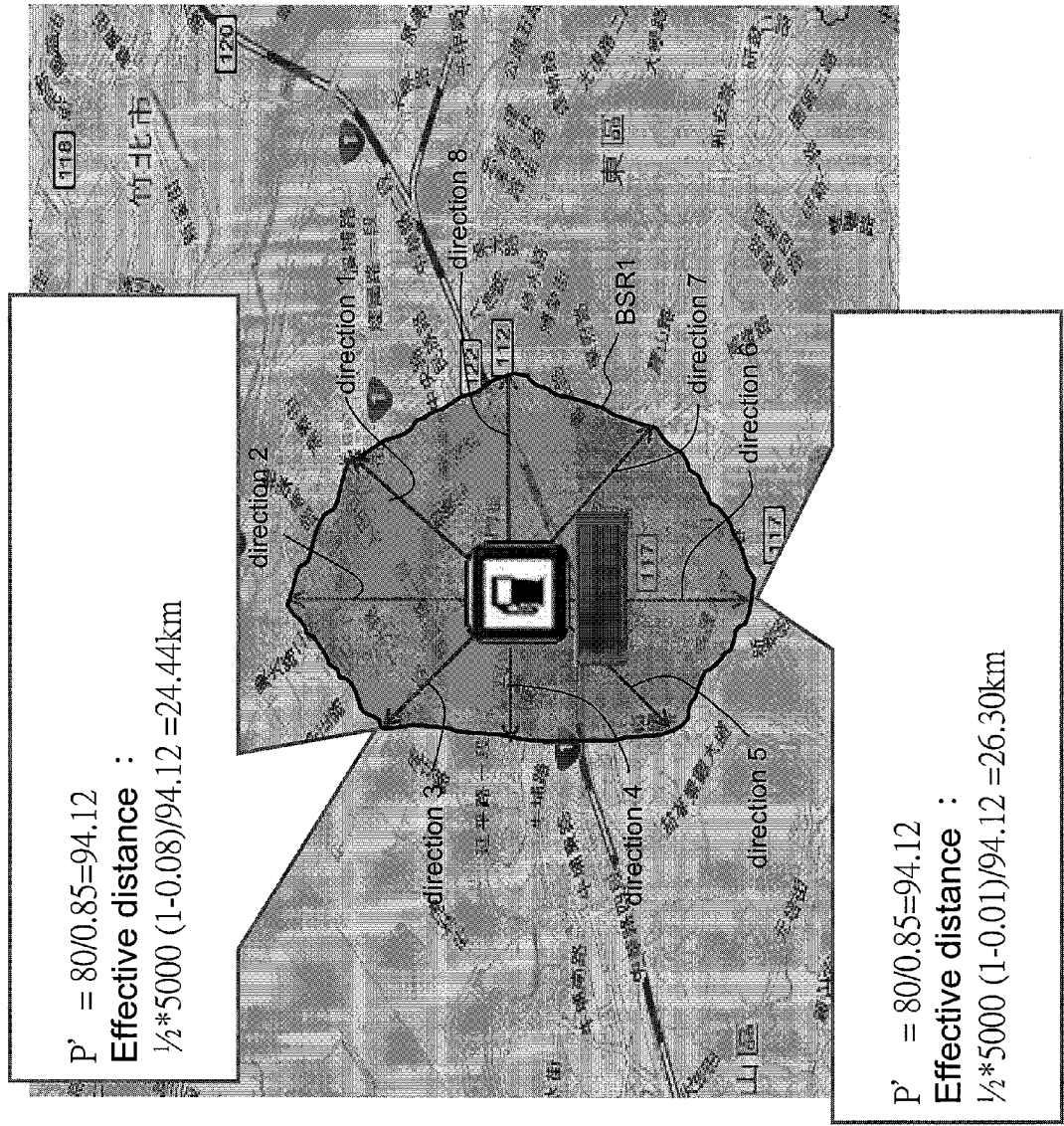
FIG. 16 is a schematic diagram of a step S526b of estimating at least one safe coverage region and at least one warning coverage region.

The step S526b of estimating the at least one safe coverage region and the at least one warning coverage region is shown in FIG. 16. In FIG. 16, one electricity supplying station is used to describe the above estimation, and if there is a plurality of the electricity supplying stations, each electricity supplying station can be used to estimate the coverage regions according to such method.

In FIG. 16, at least one electricity supplying station Ch is taken as a center to estimate at least one effective distance $d_{effect}$ of the electric vehicle C along different directions, and in FIG. 16, 8 directions (directions 1-8) are taken as an example, though the disclosure is not limited thereto, and the direction number can be increased or decreased, and relatively large direction number can be used to achieve more accurate estimation, $$d_{effect} = \frac{e \times Q \times (1 - ko)}{P'} \quad \text{(equation 5)}$$

Where, Q is the aforementioned currently remained battery energy, ko is an environment-affected energy consumption coefficient, for example, a climbing electricity consumption coefficient k1, e is a returning back parameter, $0 < e \leq 1$.

When e is set to 1, the obtained $d_{effect}$ is a distance that can be reached by the electric vehicle, and when e is set to 0.5, the obtained $d_{effect}$ is a distance from where the electric vehicle can return back.

According to the effective distances $d_{effect}$ along different directions, while taking the at least one electricity supplying station as a center, a region that can be reached by the electric vehicle C and a region that the electric vehicle C can return back are obtained to respectively serve as the at least one warning coverage region and the at least one safe coverage region.

Besides the climbing electricity consumption coefficient k1, the other electricity consumption coefficients can also be taken into consideration, for example, a real-time traffic electricity consumption coefficient k2, an electricity consumption status coefficient k3 and other electricity consumption coefficients, etc., and now ko can be k1, k2, k3, or other electricity consumption coefficient, or a sum of any two or more of the above coefficients (i.e. a sum of at least one of the coefficients).

For example, in case of considering one electricity consumption coefficient, ko=k1 or k1 or k2 or other electricity consumption coefficient.

In case of considering two electricity consumption coefficients, k0=k1+k2 or k1+k3 or k2+k3, or a sum of any two of the coefficients.

In case of considering three electricity consumption coefficients, ko=k1+k2+k3 or a sum of any three of the coefficients.

Deduced by analogy, ko can be a sum of a plurality of the coefficients. Each electricity consumption coefficient can be obtained according to existing documents or experiment data, or can be obtained through experiment. For example, referring to China urban construction industry standards, it is known that the climbing electricity consumption coefficients k1 of different slope % (defined as a climbing height/a horizontal distance) are shown in a following table:

| | Average road slope | | | | |
|---|---|---|---|---|---|
| | <4% | <10% | <15% | <19% | >=19% |
| electricity consumption coefficient | 0.01 | 0.03 | 0.08 | 0.15 | 0.26 |

For example, considering that an uphill section consumes more electricity compared to a downhill section, it is known that the same electricity supplying station have different effective distances $d_{effect}$ along different directions, so that the obtained region may have an irregular shape, and the shape of such region is determined according to terrain information, traffic information, real-time information and parameters considered during the calculation.

In FIG. 16, the effective distances $d_{effect}$ along the direction 3 and the direction 6 are estimated according to following parameters:

The electricity consumption of the electric vehicle per kilometre P=80 WH,

The weight electricity consumption coefficient kw=0.85,

The remained battery energy of a lithium battery Q=5000 WH,

The climbing electricity consumption coefficients k1 along the direction 6 and the direction 3 are respectively 0.01 (with a slope <4%) and 0.08 (with a slope 10%-15%), e=0.5

According to the above calculation equations, the maximum reachable region is obtained when e=1, and the returnable region is obtained when e=0.5. In order to keep a suitable margin of the coverage region, a safe value can be multiplied, for example, the effective distance $d_{effect}$ is further multiplied by 0.9 or another value between 0 and 1. Then, the at least one safe coverage region and the at least one warning coverage region are obtained according to the effective distances multiplied by the safe value.

Third Exemplary Embodiment

Figure 17:
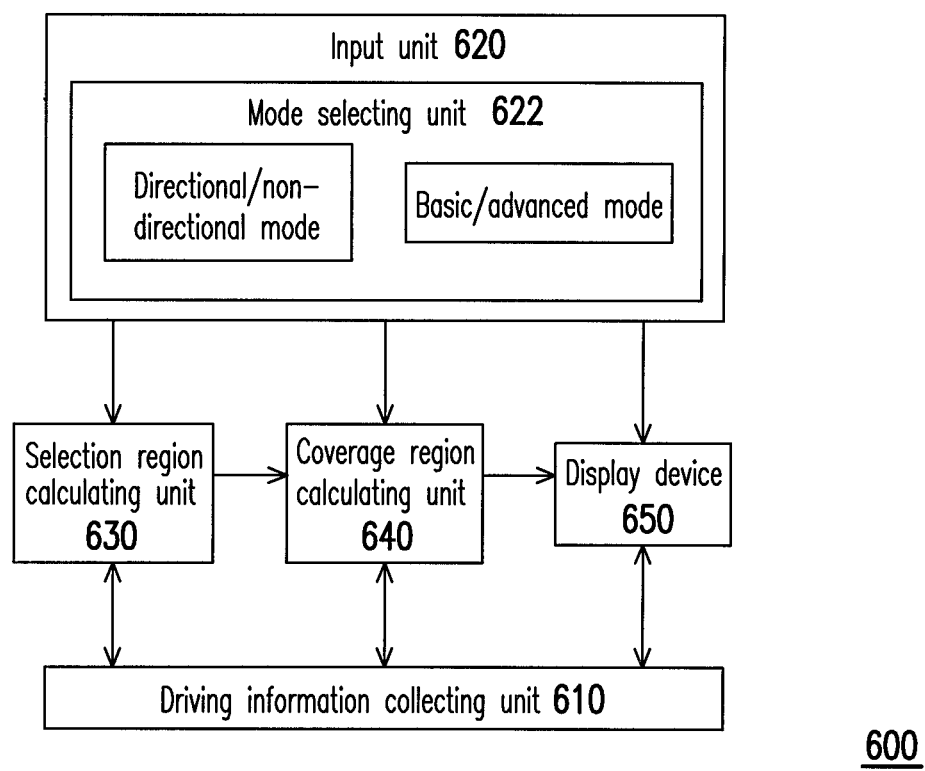
FIG. 17 is schematic diagram illustrating a driving assistant system for an electric vehicle according to a third exemplary embodiment of the disclosure.

Referring to FIG. 17, FIG. 17 is schematic diagram illustrating a driving assistant system for an electric vehicle according to a third exemplary embodiment of the disclosure. The driving assistance system is described with reference of the operational schematic diagrams of FIGS. 8A-8C and FIG. 9-FIG. 11.

The driving assistance system 600 of the electric vehicle includes a driving information collecting unit 610, an input unit 620, a selection region calculating unit 630, a coverage region calculating unit 640 and a display device 650.

The driving information collecting unit 610 may include a general on board diagnosis (OBD) system, which has an information collecting module for collecting at least the battery information of the electric vehicle and the electricity supplying station information, and the information can be collected according to a navigation map or geographic information captured through a DSRC or 3G method, and the real-time traffic information (traffic information).

The driving information collecting unit 610 receives the driving information through at least one sensor (for example, at least one of a GPS receiver, a gyroscope, a vehicle status sensor) installed in the electric vehicle C. The driving information includes at least one of the battery information, positioning information, map information (including the terrain information) and the traffic information of the electric vehicle.

The user can input trip related information through the input unit 620, for example, the user can specify a first pre-proposed selection region $SR_u$ (shown in FIG. 8A) through the input unit 620 to serve as the selection region. The input unit 620 further includes a mode selecting unit 622, and the user can select the directional mode and the non-directional mode through the mode selecting unit 622. The directional mode is adapted to a situation that the driving behaviour of electric vehicle C is directional, i.e. has a specific destination or has a specific direction planning, etc. The non-directional mode is adapted to a situation that the driving behaviour of the electric vehicle C is random, i.e. no particular destination, a free ride, hang around, and the driving direction is not particularly planned, etc.

The selection region calculating unit 630 is connected to the driving information collecting unit 610 and the input unit 620 for receiving the first pre-proposed selection region $SR_u$ (shown in FIG. 8A) or calculating a selection region $SR_r$ or $SR_d$ (shown in FIG. 8B or FIG. 8C) according to the driving information to serve as the selection region, and finding at least one electricity supplying stations Ch1, Ch2 and Ch3 (shown in FIG. 9) within the selection region $SR_u$, $SR_r$ or $S_d$.

In FIG. 9, three electricity supplying stations are found, and the number of the electricity supplying stations is subject to the actual finding number. When the selection region is calculated according to the driving information, the selection region calculating unit 630 calculates the selection region $SR_r$ (non-directional) or $SR_d$ (directional) according to the mode selected by the input unit 620. According to the mode selected by the input unit 620, the selection region calculating unit 630 performs calculations the same to that described in the steps S112a and 112b of the first exemplary embodiment, and detailed descriptions thereof are not repeated.

The coverage region calculating unit 640 is connected to the driving information collecting unit 610, the input unit 620 and the selection region calculating unit 630, and takes the at least one electricity supplying stations Ch1, Ch2 and Ch3 as centers to calculate regions (the solid line regions shown in FIG. 10) that the electric vehicle is capable of returning back under current battery energy according to the driving information to serve as at least one safe coverage regions BSR1, BSR2 and BSR3, and calculate maximum regions (the dot line regions shown in FIG. 10) capable of being reached by the electric vehicle to serve as at least one warning coverage regions BWR1, BWR2 and BWR3. The at least one safe coverage regions are united to obtain a united region to serve as the battery energy safe driving region BSR (the solid line region shown in FIG. 11) of the electric vehicle, and the at least one warning coverage regions are united to obtain a united region to serve as the battery energy warning driving region BWR (the dot line region shown in FIG. 11) of the electric vehicle.

The display device 650 is connected to the driving information collecting unit 610, the input unit 620 and the coverage region calculating unit 640 for displaying the battery energy safe driving region BSR and the battery energy warning driving region BWR. The display device 650 includes an in-vehicle projection device, a handheld mobile device or a general display screen.

The mode selecting unit 622 may further provide the user to select modes including a basic mode and an advanced mode. When the basic mode is selected, the coverage region calculating unit 640 calculates the at least one safe coverage regions BSR1, BSR2 and BSR3 and the at least one warning coverage regions BWR1, BWR2 and BWR3 according to the weight electricity consumption information kw and the climbing electricity consumption information k1 of the driving information. When the advanced mode is selected, the coverage region calculating unit 640 calculates the at least one safe coverage regions BSR1, BSR2 and BSR3 and the at least one warning coverage regions BWR1, BWR2 and BWR3 according to at least one of the battery aging information, the speed electricity consumption information kv, the real-time traffic electricity consumption information k2 and the electricity consumption status information k3 of the driving information besides the driving information considered in the basic mode.

The method that the coverage region calculating unit 640 calculates the at least one safe coverage regions BSR1, BSR2 and BSR3 and the at least one warning coverage regions BWR1, BWR2 and BWR3 is the same as that described in the steps S526a and S526b of the first exemplary embodiment, and detailed descriptions thereof are not repeated.

The OBD system serving as the driving information collecting unit 610 collects data (the driving information) from the information collecting module every a certain time interval (for example, every certain seconds), and the coverage region calculating unit 640 recalculates the battery energy safe driving region BSR and the battery energy warning driving region BWR every a certain time interval to present a latest battery energy safe driving region BSR for the driver, and the driver may notice that the battery energy safe driving region decreases as a driving time increases.

In summary, the driving assistant method and system for the electric vehicle of the disclosure is different to the conventional navigation technique, in the disclosure, a regional guidance (presented through a graphical interface) can be obtained without setting a starting point and a destination, which may provide the user a more flexible driving path selection. The driving assistant method and system for the electric vehicle of the disclosure can be added to the conventional navigation device. Moreover, the regional guidance (i.e. graphic blocks) of the disclosure can be dynamically updated along with the collected driving information (the terrain information, the battery information and the traffic information), which may provide the user a real-time driving path selection. In addition, according to the driving assistant method and system for the electric vehicle of the disclosure, when the electric vehicle is started up, the battery energy safe driving region is calculated and is dynamically presented to the user through UI display. In this way, the problem that none charging station and none battery exchange station are located around when the battery of the electric vehicle is required to be charged is avoided.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A driving assistant method for an electric vehicle, comprising:
   when the electric vehicle is started up, calculating and displaying a battery energy safe driving region of the electric vehicle according to driving information of the electric vehicle, wherein the driving information comprises battery information of the electric vehicle; and
   dynamically updating the battery energy safe driving region according to the driving information of the electric vehicle, wherein a method of defining the battery energy safe driving region comprises:
      selecting at least one electricity supplying station;
      calculating energy consumption per unit distance of the electric vehicle and taking the at least one electricity supplying station as a center to calculate a region that the electric vehicle is capable of returning back to the at least one electricity supplying station under a current battery energy according to the energy consumption per unit distance of the electric vehicle to serve as at least one safe coverage region; and
      uniting the safe coverage regions with each other to obtain a united region to serve as the battery energy safe driving region when an amount of the at least one safe coverage region is larger than one,
   wherein the energy consumption $P'$ per unit distance of the electric vehicle is obtained according to an equation $P'=P/ki$,
   wherein P is energy consumption per unit distance obtained according to data of original equipment manufacturer of the electric vehicle, ki is a vehicle status-related electricity consumption coefficient.

2. The driving assistant method for the electric vehicle as claimed in claim 1, the battery energy safe driving region is a region in which the electric vehicle is capable of driving randomly without leading an incapability for electricity supplying.

3. The driving assistant method for the electric vehicle as claimed in claim 1, wherein the step of selecting the at least one electricity supplying station comprises:
   setting a selection region; and
   searching and obtaining the at least one electricity supplying station within the selection region.

4. The driving assistant method for the electric vehicle as claimed in claim 3, wherein the step of setting the selection region comprises specifying the selection region.

5. The driving assistant method for the electric vehicle as claimed in claim 3, wherein the step of setting the selection region comprises determining the selection region according to a position and speed information of the electric vehicle.

6. The driving assistant method for the electric vehicle as claimed in claim 3, wherein the step of setting the selection region comprises determining the selection region according to a position, a moving direction and speed information of the electric vehicle.

7. The driving assistant method for the electric vehicle as claimed in claim 1, further comprising:
   when a position of the electric vehicle exceeds the battery energy safe driving region, displaying a battery energy warning driving region of the electric vehicle, and displaying at least one electricity supplying station within the battery energy warning driving region, wherein the battery energy warning driving region is defined as a maximum region outside the battery energy safe driving region capable of being reached by the electric vehicle; and
   dynamically updating the battery energy warning driving region according to the driving information.

8. The driving assistant method for the electric vehicle as claimed in claim 7, wherein a method of determining the battery energy safe driving region and the battery energy warning driving region comprises:
   selecting at least one electricity supplying station;
   taking the at least one electricity supplying station as a center to calculate a region that the electric vehicle is capable of returning back to the at least one electricity supplying station under a current battery energy according to the driving information to serve as at least one safe coverage region, and calculate a maximum region capable of being reached by the electric vehicle to serve as at least one warning coverage region; and
   uniting the safe coverage regions with each other to obtain a united region to serve as the battery energy safe driving region when an amount of the at least one safe coverage region is larger than one, and uniting the warning coverage regions with each other to obtain a united region to serve as the battery energy warning driving region when an amount of the at least one warning coverage region is larger than one.

9. The driving assistant method for the electric vehicle as claimed in claim 5, wherein the step of setting the selection region comprises:
   determining a center of the selection region according to the position and a moving direction of the electric vehicle; and
   calculating a radius of the selection region according to the battery information and speed information of the electric vehicle.

10. The driving assistant method for the electric vehicle as claimed in claim 1, wherein the driving information comprises at least one of weight information, positioning information, map information and traffic information of the electric vehicle.

11. The driving assistant method for the electric vehicle as claimed in claim 1, wherein the battery information comprises at least one of electricity consumption status information, remained battery energy information and battery aging information of the electric vehicle.

12. The driving assistant method for the electric vehicle as claimed in claim 10, wherein the map information comprises terrain information.

13. The driving assistant method for the electric vehicle as claimed in claim 10, wherein the traffic information comprises real-time traffic information.

14. A driving assistant method for an electric vehicle, comprising:
a electricity supplying station selecting step, for setting a selection region comprising at least one electricity supplying station for the electric vehicle, and finding the at least one electricity supplying station within the selection region;
a coverage region calculating step, for calculating energy consumption per unit distance of the electric vehicle according to driving information of the electric vehicle, and taking the at least one electricity supplying station as a center to estimate a region that the electric vehicle is capable of returning back along different directions under a current battery energy according to the energy consumption per unit distance of the electric vehicle to serve as at least one safe coverage region, and estimate a region capable of being reached by the electric vehicle to serve as at least one warning coverage region, and uniting the safe coverage regions with each other to obtain a battery energy safe driving region when an amount of the at least one safe coverage region is larger than one, and uniting the warning coverage regions with each other to obtain a battery energy warning driving region when an amount of the at least one warning coverage region is larger than one;
a dynamic updating step, for dynamically updating the battery energy safe driving region and the battery energy warning driving region according to the driving information; and
a display step, for displaying the updated battery energy safe driving region, and the updated battery energy warning driving region,
wherein the energy consumption P' per unit distance of the electric vehicle is obtained according to an equation P'=P/ki,
wherein P is energy consumption per unit distance obtained according to data of original equipment manufacturer of the electric vehicle, ki is a vehicle status-related electricity consumption coefficient.

15. The driving assistant method for the electric vehicle as claimed in claim 14, wherein the step of setting the selection region comprises specifying the selection region.

16. The driving assistant method for the electric vehicle as claimed in claim 14, wherein the step of setting the selection region comprises:
determining a center of the selection region according to a current position and a moving direction of the electric vehicle; and
calculating a radius of the selection region according to battery information and speed information of the electric vehicle.

17. The driving assistant method for the electric vehicle as claimed in claim 14, wherein the step of setting the selection region comprises:
taking a current position of the electric vehicle as a center of the selection region; and
calculating a radius of the selection region according to battery information and speed information of the electric vehicle.

18. The driving assistant method for the electric vehicle as claimed in claim 14, wherein the vehicle status-related electricity consumption coefficient ki is a battery aging electricity consumption coefficient.

19. The driving assistant method for the electric vehicle as claimed in claim 14, wherein the vehicle status-related electricity consumption coefficient ki is a product of at least one of a battery aging electricity consumption coefficient, a weight electricity consumption coefficient and a speed electricity consumption coefficient.

20. The driving assistant method for the electric vehicle as claimed in claim 14, wherein a method of estimating the at least one safe coverage region and the at least one warning coverage region comprises:
taking the at least one electricity supplying station as a center to estimate at least one effective distance of the electric vehicle along different directions $$d_{effect} = \frac{e \times Q \times (1-ko)}{P'},$$

wherein Q is current remained battery energy, ko is an environment-affected electricity consumption coefficient, and e is a returning back parameter, 0<e≤1, when e is set to 1, the obtained $d_{effect}$ is a distance capable of being reached by the electric vehicle, and when e is set to 0.5, the obtained $d_{effect}$ is a distance from where the electric vehicle is capable of returning back; and
taking the at least one electricity supplying station as a center to obtain a region capable of being reached by the electric vehicle and a region that the electric vehicle is capable of returning back according to the effective distances $d_{effect}$ along different directions to respectively serve as the at least one warning coverage region and the at least one safe coverage region.

21. The driving assistant method for the electric vehicle as claimed in claim 20, wherein the environment-affected electricity consumption coefficient ko is a climbing electricity consumption coefficient.

22. The driving assistant method for the electric vehicle as claimed in claim 20, wherein the environment-affected electricity consumption coefficient ko is a sum of at least one of a climbing electricity consumption coefficient, a real-time traffic electricity consumption coefficient and an electricity consumption status coefficient.

23. The driving assistant method for the electric vehicle as claimed in claim 20, further comprising:
multiplying the at least one effective distance by a safe value, wherein the safe value is between 0 and 1; and
obtaining the at least one safe coverage region and the at least one warning coverage region according to the effective distance multiplied with the safe value.

24. A driving assistant system for an electric vehicle, comprising:
a driving information collecting unit, for receiving driving information through at least one sensor installed in the electric vehicle, wherein the driving information comprises at least one of battery information, positioning information, map information and traffic information of the electric vehicle;

an input unit, for receiving trip related information, wherein the trip related information comprises a first pre-proposed selection region;

a selection region calculating unit, connected to the driving information collecting unit and the input unit, for receiving the first pre-proposed selection region or calculating a second pre-proposed selection region according to the driving information as a selection region, and finding at least one electricity supplying station within the selection region;

a coverage region calculating unit, connected to the driving information collecting unit, the input unit and the selection region calculating unit, for calculating energy consumption per unit distance of the electric vehicle and taking the at least one electricity supplying station as a center to calculate a region that the electric vehicle is capable of returning back to the at least one electricity supplying station under current battery energy of the electric vehicle according to the energy consumption per unit distance of the electric vehicle to serve as at least one safe coverage region, and calculate a maximum region capable of being reached by the electric vehicle to serve as at least one warning coverage region, and uniting the safe coverage regions with each other to obtain a battery energy safe driving region of the electric vehicle when an amount of the at least one safe coverage region is larger than one, and uniting the warning coverage regions with each other to obtain a battery energy warning driving region of the electric vehicle when an amount of the at least one warning coverage region is larger than one, wherein the energy consumption P' per unit distance of the electric vehicle is obtained according to an equation P'=P/ki, P is energy consumption per unit distance obtained according to data of original equipment manufacturer of the electric vehicle, and ki is a vehicle status-related electricity consumption coefficient; and a display device, connected to the driving information collecting unit, the input unit and the coverage region calculating unit, for displaying the battery energy safe driving region and the battery energy warning driving region.

25. The driving assistant system for the electric vehicle as claimed in claim 24, wherein the input unit comprises a mode selecting unit for providing a user to select modes comprising a directional mode and a non-directional mode, wherein the directional mode is adapted to a situation that a driving behaviour of the electric vehicle is directional, and the non-directional mode is adapted to a situation that the driving behaviour of the electric vehicle is random, and wherein the selection region calculating unit calculates the second pre-proposed selection region according to the mode selected by the input unit.

26. The driving assistant system for the electric vehicle as claimed in claim 25, wherein when the directional mode is selected, the selection region calculating unit performs following steps:

estimating a battery remaining time T of the electric vehicle according to the battery information in the driving information;

estimating a position of the electric vehicle after a time t according to direction information and speed information of the electric vehicle in the driving information, wherein 0<t<T; and taking the estimated position of the electric vehicle as a center and taking the speed information V of the driving information times the battery remaining time T as a radius to obtain the second pre-proposed selection region.

27. The driving assistant system for the electric vehicle as claimed in claim 25, wherein when the non-directional mode is selected, the selection region calculating unit performs following steps:

estimating a battery remaining time T of the electric vehicle according to the battery information in the driving information; and taking a current position of the electric vehicle in the driving information as a center and taking a current speed V of the electric vehicle in the driving information times the battery remaining time T as a radius to obtain the second pre-proposed selection region.

28. The driving assistant system for the electric vehicle as claimed in claim 24, wherein a method that the coverage region calculating unit calculates the at least one safe coverage region and the at least one warning coverage region comprises following steps:

estimating energy consumption per unit distance of the electric vehicle according to the driving information; and taking the at least one electricity supplying station as a center to estimate a distance that the electric vehicle is capable of returning back along different directions and a distance that the electric vehicle is capable of reaching according to the driving information to respectively obtain a returnable region to serve as the at least one safe coverage region and obtain a reachable region to serve as the at least one warning coverage region.

29. The driving assistant system for the electric vehicle as claimed in claim 24, wherein the input unit comprises a mode selecting unit for providing a user to select modes comprising a basic mode and an advanced mode, wherein when the basic mode is selected, the coverage region calculating unit calculates the at least one safe coverage region and the at least one warning coverage region according to weight electricity consumption information and climbing electricity consumption information in the driving information, wherein when the advanced mode is selected, the coverage region calculating unit calculates the at least one safe coverage region and the at least one warning coverage region according to at least one of battery aging information, speed electricity consumption information, real-time traffic electricity consumption information and electricity consumption status information in the driving information besides the driving information considered in the basic mode.

30. The driving assistant system for the electric vehicle as claimed in claim 24, wherein the driving information collecting unit comprises an on board diagnosis (OBD) system.

31. The driving assistant system for the electric vehicle as claimed in claim 24, wherein the at least one sensor comprises at least one of a global positioning system (GPS) receiver, a gyroscope and a vehicle status sensor.

32. The driving assistant system for the electric vehicle as claimed in claim 24, wherein the display device comprises an in-vehicle projection device, a handheld mobile device or a display screen.

* * * * *